United States Patent [19]
Schwam

[11] 3,831,529
[45] Aug. 27, 1974

[54] FLUID TRUCK SNUBBER
[76] Inventor: Stuart A. Schwam, 372 Robinson Dr., Broomall, Pa. 19008
[22] Filed: Aug. 16, 1973
[21] Appl. No.: 388,785

Related U.S. Application Data
[63] Continuation-in-part of Ser. No. 300,109, Oct. 24, 1972, abandoned.

[52] U.S. Cl............... 105/197 DH, 267/4, 267/8 R, 267/127
[51] Int. Cl........... B61f 5/12, F16f 9/06, F16f 9/32
[58] Field of Search..... 105/197 D, 197 DH, 197 R; 267/3, 4, 8 R, 9 R, 34, 64 R, 64 A, 127

[56] References Cited
UNITED STATES PATENTS

| | | | |
|---|---|---|---|
| 2,099,240 | 11/1937 | Sproul | 267/4 |
| 2,573,165 | 10/1951 | Settles | 105/197 DH |
| 3,005,629 | 10/1961 | Williams | 267/8 R |
| 3,041,061 | 6/1962 | Funkhouser | 267/8 R |
| 3,145,055 | 8/1964 | Carter | 267/127 X |
| 3,464,366 | 9/1969 | Seay | 105/197 DH |
| 3,595,350 | 7/1971 | Wiebe | 105/197 DH |
| 3,626,864 | 12/1971 | Wiebe | 105/197 DH |

Primary Examiner—M. Henson Wood, Jr.
Assistant Examiner—Howard Beltran
Attorney, Agent, or Firm—Louis V. Schiavo

[57] ABSTRACT

The truck of a railroad car or similar vehicle is provided with a hydraulic fluid single action piston and cylinder motion damping device located in each spring group, between the spring seat and the truck bolster. The device is provided with unvalved passages by means of which hydraulic fluid is by-passed around the piston head. As a consequence, the piston is capable of yielding to accommodate movement of the truck bolster regardless of the magnitude of the load applied by the truck bolster to the piston. The device is also provided with valved passages through which hydraulic fluid flows back and forth between a compression chamber and a reservoir in response to actuation of the piston.

In addition, the device may be provided with a piston which floats upon the hydraulic fluid in the reservoir. The floating piston is arranged for keeping the hydraulic fluid in the reservoir interposed between the air in the reservoir and said valved passages, irrespective of which end of the device is uppermost.

24 Claims, 10 Drawing Figures

FLUID TRUCK SNUBBER

CROSS-REFERENCES TO RELATED APPLICATIONS

This application is a continuation-in-part of copending parent U.S. Pat. application Ser. No. 300,109, filed Oct. 24, 1972 now abandoned.

BACKGROUND OF THE INVENTION

1. Field of the Invention

With the advent of large capacity, high center of gravity freight cars a few years ago, the railroad industry was introduced to the roll stability problem, a classical problem in the area of solid mechanics. This dynamic phenomenon is a function of the inherent dynamic characteristics of the freight car, and it manifests itself throughout a critical speed range by excessive roll amplitude of the car body. When related to a freight car, the problem is further complicated because the car body is an inverted pendulum. If the motion of the center of gravity is not held within certain prescribed bounds, the overturning moment becomes greater than the righting moment, and this results in an unstable, violently oscillating condition. The phenomenon may manifest itself dramatically in the form of wheel lifting and derailing. However, it may also manifest itself by the introduction of a fatigue environment which leads to eventual failure of car and truck parts. Accordingly, the invention relates generally to devices for reducing car body roll to a tolerable level at all speeds, the purpose being to eliminate wheel lift-off and to reduce pitch and vertical motion.

2. Description of the Prior Art

U.S. Pat. No. 3,626,864, issued to Donald Wiebe, on Dec. 14, 1971, discloses a truck snubber for a railroad car. The snubber is a hydraulic fluid single action piston and cylinder device located in a spring group, between the spring seat and truck bolster, and it is operative only when a predetermined minimum load is applied to the piston. While the applied load is approaching, and until it reaches, the predetermined level, and thereafter when the applied load falls below said level, the snubber functions as a rigid strut fixed in length. Accordingly, whenever the load applied to the piston is below the predetermined level, the snubber is converted into an unyielding abutment which effectively arrests all further downward motion of the truck bolster. In effect, the snubber bottoms out or becomes solid in compression and this results in an operation which does not have the overall smoothness desired.

In my said co-pending parent application for United States Letters Patent, there is disclosed an improved motion damping device. The device is provided with passages at the bottom thereof through which hydraulic fluid flows back and forth between a compression chamber and a reservoir in response to actuation of the piston. The reservoir is only partially filled with hydraulic fluid; the space in the reservoir above the hydraulic fluid is filled with air. When the device is disposed with the right end thereof uppermost, the hydraulic fluid is at the bottom of the reservoir, interposed between the air in the reservoir and said passages. As a consequence, when the piston is extended, hydraulic fluid is readily drawn from the reservoir through aid passages into the compression chamber. However, when the device is tilted from the vertical sufficiently or disposed with the wrong end thereof uppermost, the hydraulic fluid and the air in the reservoir exchange places. As a consequence, the air is interposed between the hydraulic fluid in the reservoir and said passages, and when the piston is extended, air, which is highly compressible, instead of hydraulic fluid, which is not compressible, is drawn into the compression chamber. Thus, there occurs a sharp loss of efficiency, and for this reason the device disclosed in my said co-pending parent application for United States Letters Patent is not entirely satisfactory for some purposes. It is limited to use in situations where the device will always remain generally in a vertical position.

SUMMARY OF THE INVENTION

A principal object of the present invention is to provide an improved motion damping device for the truck of a railroad car or similar vehicle, the device being of the hydraulic fluid single action piston and cylinder type located in an associated spring group, between the spring seat and the truck bolster.

Another object of the present invention is to provide such a motion damping device which yieldably cushions the applied load without requiring the same to be at least equal to a predetermined minimum load.

Still another object of the present invention is to provide such a motion damping device which will yield to accommodate downward movement of the truck bolster regardless of the magnitude of the load applied to the piston.

And still another object of the present invention is to provide such a motion damping device with unvalved passages for by-passing hydraulic fluid around the piston head, as a consequence of which the construction is comparatively simple.

Another object of the present invention is to provide such a motion damping device with valved passages at the bottom thereof placing a compression chamber in communication with a reservoir, and with means for keeping hydraulic fluid at the bottom of said reservoir interposed between air in the reservoir and said passages even when the device is tilted to one side or disposed with the wrong end thereof uppermost.

Still another object of the present invention is to provide such motion damping device with valved passages at the bottom thereof placing a compression chamber in communication with a reservoir, and with a floating piston in the reservoir for keeping the hydraulic fluid in the reservoir separated from the air therein, and for preventing the hydraulic fluid from exchanging places with the air when the device is tilted to one side or disposed with the wrong end uppermost.

DESCRIPTION OF PREFERRED EMBODIMENT

Figure 1:
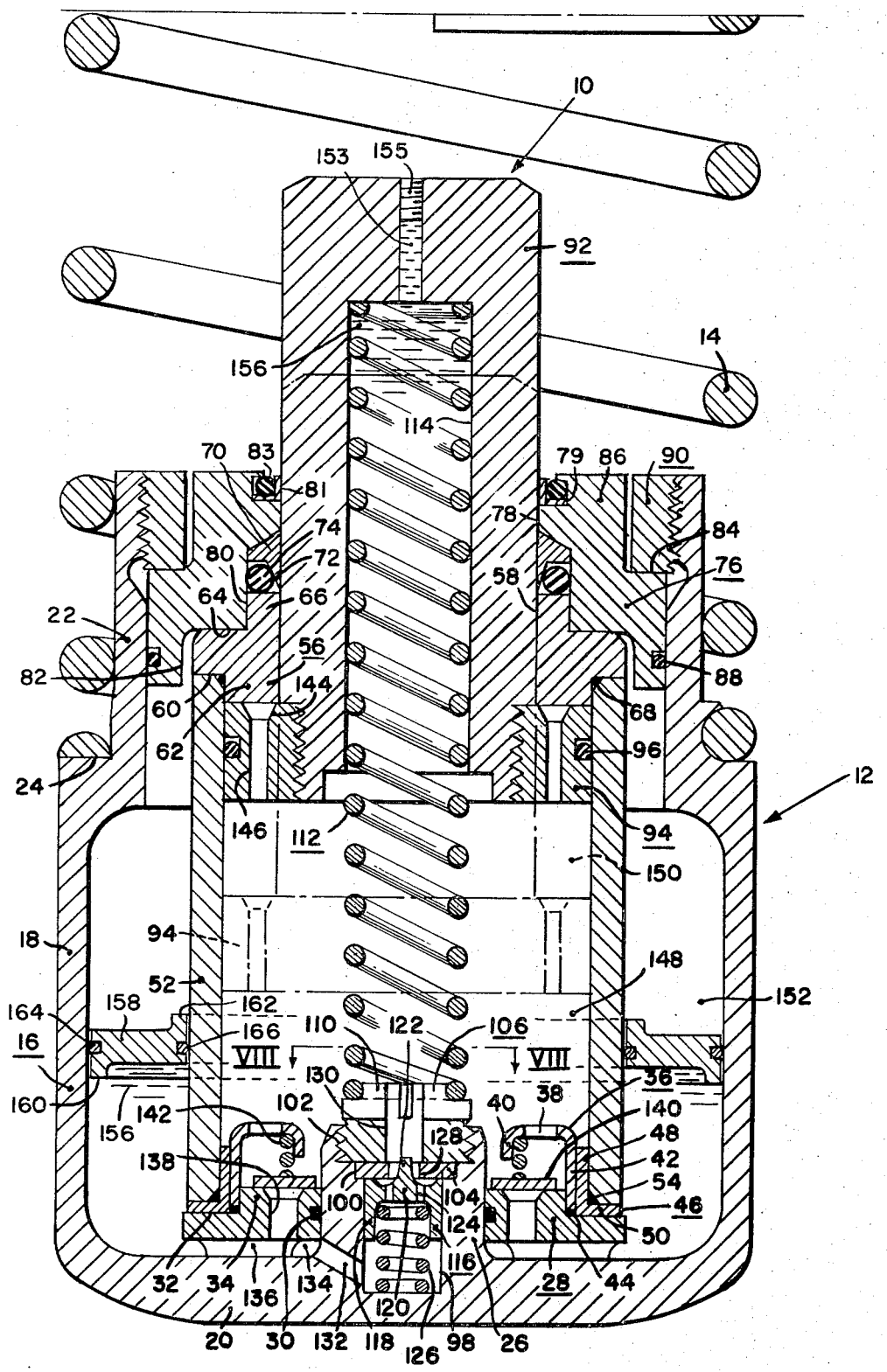
FIG. 1 is a longitudinal section through a motion damping device constructed in accordance with the present invention, the piston being shown in its fully extended position (full lines) and in a partially retracted position (broken lines)

The following description is directed to the specific form of the invention shown in the drawings. It is not addressed to the scope of the invention, which may be practiced in various forms.

A motion damping device constructed in accordance with the present invention comprises an extensible and retractable assembly 10 working in a stationary main body assembly 12 which mounts a compression coil spring 14.

The stationary main body assembly 12 includes a casing 16 having an upright cylindrical wall 18 with a top which is open and a bottom which is closed by a wall 20. The upper portion of the cylindrical wall is reduced in diameter, as at 22, to provide a circumferentially extending shoulder 24. The spring 14 embraces the reduced diameter portion of the cylindrical wall, its lower end is seated upon the shoulder 24, and it is of a length to extend upwardly a substantial distance beyond the casing 16.

Formed integrally with the bottom wall 20 is a centrally disposed cylindrical boss 26 over which is fitted an annulus 28 seated directly upon the bottom wall 20. The inner periphery of the annulus is fitted with an O-ring 30 embracing the boss 26. The outer periphery of the annulus is provided with a recess affording a shoulder 32 extending about a reduced diameter portion 34 of the annulus.

Overlying the annulus is an annular member 36 provided with a series of circumferentially spaced openings 38. At its inner periphery the member 36 is provided with a short depending cylindrical rim 40, and at its outer periphery the member 36 is provided with a longer depending cylindrical rim 42. Thus, in transverse section, the member 36 is of inverted J-shape, as shown. The rim 42 is fitted over the reduced diameter portion 34 of the annulus 28, and interposed between the rim 42 and the shoulder 32 of the annulus is an O-ring 44 embracing the reduced diameter portion 34 of the annulus 28. Thus the rim 40 is disposed a substantial distance above the top of the annulus 28.

Also overlying the annulus is an annular member 46 provided with a cylindrical body 48 fitted over the member 36, and with a radially outwardly extending flange 50 seated upon the shoulder 32 of the annulus. Thus, in transverse section, the member 46 is L-shaped, as shown.

Fitted over the cylindrical body 48 of the member 46 is the lower end portion of a cylindrical member 52, the lower terminal edge of which is seated upon the flange 50 of the member 46. Interposed between the members 46 and 52 is an O-ring 54 embracing the cylindrical body 48. The member 52 is of a length to extend upwardly into the portion 22 of the casing 16 for mounting a member 56.

The member 56 is provided centrally with a bore 58. The outer periphery of the member 56 is provided with a recess in the undersurface thereof affording a shoulder 60 extending about a reduced diameter portion 62 of the member 56, and with a recess in the upper surface thereof affording a shoulder 64 extending about a reduced diameter portion 66 of the member 56. The reduced diameter portion 62 is fitted into the upper end portion of the cylindrical member 52, and interposed between the members 56 and 52 is an 0-ring 68 embracing the reduced diameter portion 62 of the member 56.

Overlying the reduced diameter portion 66 of the member 56 and seated thereon is a ring member 70, the undersurface of which is provided with a circumferentially extending recess 72 for accommodating an O-ring 74.

Slidably fitted into the reduced diameter portion 22 of the cylindrical wall 18 is an annular member 76 provided with a central bore 78. The upper surface of the member 76 is recessed, as at 79, to accommodate a wiper ring 81, L-shaped in transverse section, as shown, and an 0-ring 83. The undersurface of member 76 is counterbored, as at 80 and 82, to accommodate the ring member 70, 0-ring 74 and annular member 56. The outer periphery of member 76 is provided with a circumferentially extending recess which affords a shoulder 84 and a reduced diameter portion 86. Interposed between the member 76 and the reduced diameter portion 22 of the cylindrical wall 18 is an O-ring 88.

Threaded into the reduced diameter portion 22 of the cylindrical wall 18 is a ring member 90 nested in the recess which affords the shoulder 84. The bottom of the member is seated on the shoulder 84. Thus the members 76, 56, 52, 46 and 28 are clamped in position between the ring member 90 and the bottom wall 20 of the casing 16.

The extensible and retractable assembly 10 comprises a piston rod 92 which is slidably projected through the central bore 58 of the member 56, ring member 70, wiper ring 81 and the central bore 78 of annular member 76. Threaded onto a reduced diameter lower end portion of the rod is a piston head 94 for working in the cylindrical member 52. Interposed between the piston head 94 and the member 52 is an 0-ring 96.

The boss 26 is provided with a central bore 98 and counterbores 100 and 102. The counterbore 100 accommodates a plate 104, and threaded into the counterbore 102 is a member 106 which secures the plate 104 in position. The top of the member 106 is cross-axially grooved, as at 107, and is provided with a recess affording a shoulder 108 extending about a reduced diameter portion 110 of the member 106. Seated upon the shoulder 108 and extending about the reduced diameter portion 110 is the lower end portion of a compression coil spring 112, which extends upwardly therefrom to the piston rod 92. The piston rod is provided with a central bore 114 for receiving a substantial length of the spring 112, which urges the piston rod upwardly and the piston head into engagement with the member 56.

Underlying the plate 104 is a poppet valve 116 provided with a hollow cylindrical body 118 slidably nested in the bore 98. Extending across the upper end portion of the body 118, in spaced close relation to the plate 104, is a cross-axially extending wall 120 mounting a centrally disposed tapered pin 122. At the base of the pin are a series of circumferentially spaced openings 124 extending through the wall 120. Underlying the wall 120 is a compression coil spring 126 which urges the poppet valve 116 upwardly and the body 118 into engagement with the plate 104. Thus the pin 122 is projected freely through an orifice 128 provided in the plate 104, which orifice registers with a central bore 130 provided in the member 106. In a plane coincident with the undersurface of the plate 104, the orifice 128 is of a diameter sufficient to provide an annular space extending about the base of the pin 122.

The bore 98 in the boss 26 is permanently in communication with the annular space provided between the cylindrical member 52 and the cylindrical wall 18 of the casing 16 through a system of passages including one or more radially extending passages 132 formed in the boss 26, a passage 134 extending about the base of the boss 26 and provided by a suitable recess in the undersurface of the annulus 28 extending about the inner periphery thereof, and a plurality of radially extending passages 136 provided by suitably grooving the undersurface of the annulus 28.

The annular space provided between the cylindrical member 52 and the cylindrical wall 18 of the casing 16 may be placed in communication with the interior of the cylindrical member 52 through the several passages 136, and a plurality of openings 138 circumferentially spaced about the annulus 28 and extending therethrough, there being one opening 138 for each passage 136. Overlying the annulus 28 and covering the several openings 138 is a ring plate 140 serving as a check valve. The valve is biased downwardly by a compression coil spring 142, the upper end portion of which embraces the rim 40 of the annular member 36 and seats against the undersurface of the member 36.

The upper surface of the piston head 94 is provided with a circumferentially extending groove 144, and extending from the groove downwardly through the piston head 94 are a series of circumferentially equally spaced passages 146.

Referring particularly to FIG. 1, the interior of the cylindrical member 52 affords a working chamber, and the space within the cylindrical member 52, between the annulus 28 on the one hand and the piston rod 92 and piston head 94 on the other hand, affords a compression chamber 148. When the piston head moves downwardly against the influence of the return spring 112, for example, from the extended full line position thereof shown in FIG. 1 to the partially retracted broken line position thereof shown in FIG. 1, the annular space within the cylindrical member 52 and extending about the piston rod 92, between the piston head 94 and the member 56, affords a compensating chamber 150. The annular space within the casing 16 and extending about the cylindrical member 52, between the bottom wall 20 of the casing 16 and the member 76, affords a reservoir 152. The compression chamber 148 is completely filled with hydraulic fluid, and the reservoir 152 is partially filled with hydraulic fluid. The piston rod 92 is provided with a passage 153 normally plugged, as at 155. The plug may be removed in order to purge the interior of the device of air.

Figure 2:
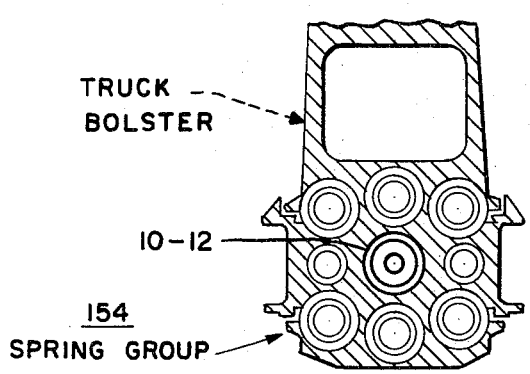
FIG. 2 is a plan view showing a spring group supporting one end of a truck bolster and the motion damping device of the present invention in the midst of the springs.

A motion damping device constructed in accordance with the present invention may be placed in the center of a truck spring group to replace the outer coil or the inner and outer spring combination at that location. No mechanical attachment to either the side frame 151 of the wheeled truck or the truck bolster 157 is required, as a consequence of which the device may be applied as simply as a truck spring. Its presence in the spring group is not apparent. Such an arrangement is shown in FIG. 2, wherein the motion damping device, designated 10–12, is disposed in the midst of a spring group, generally designated 154. When the vehicle is empty, the compression coil spring 14 and the springs of the spring group 154 conjointly act to support the truck bolster at a predetermined level which provides a substantial distance between the upper extremity of the piston rod 92 and the truck bolster. The compression coil or retention spring 14, being partially compressed, functions to hold the motion damping device in position.

In the operation of the motion damping device, i.e., when the vehicle is loaded, downward movement of the truck bolster is against the influence of retention spring 14 until the upper extremity of the spring is flush with the upper extremity of the piston rod 92. Thereafter, downward movement of the truck bolster is not only against the influence of the retention spring 14 but also against the influence of the coil compression spring 112 and the resistance to flow of hydraulic fluid through the annular space extending about the base of the pin 122, in the plane of the undersurface of the plate 104.

As the motion damping device is compressed, the piston head 94 moves downwardly, as a consequence of which the compensating chamber 150 forms and increases in volume while at the same time the compression chamber decreases in volume. Hydraulic fluid is forced from the compression chamber into the compensating chamber via the several large unvalved passages 146 in the piston head 94, but the compensating chamber is incapable of taking all of the hydraulic fluid displaced from the compression chamber. As a consequence, the ring plate or check valve 140 being closed, the major portion of the hydraulic fluid is forced into the reservoir 152 via the central bore 130 in the member 106, the annular space at the base of the pin 122 defined by the pin projecting upwardly through the orifice 128 in the plate 104, the several openings 124 in the poppet valve 116, the bore 98 and the several passages 132, 134 and 136.

Figure 5:
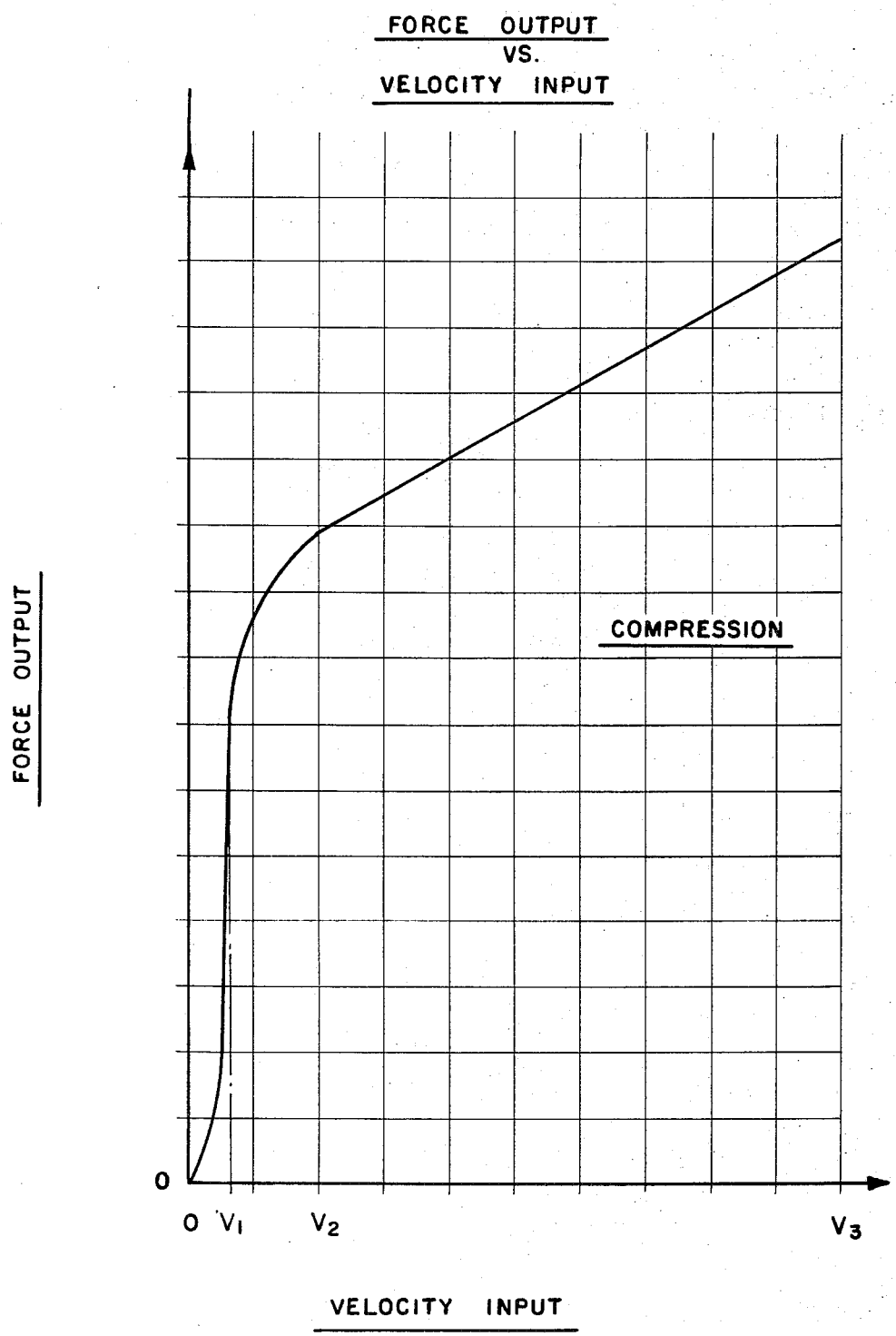
FIG. 5 is a diagram illustrating the force output/velocity input characteristics of the motion damping device.

The member 106, plate 104, valve 116 and spring 126 conjointly provide a flow restricting compression valve which governs the force-velocity characteristics of the motion damping device, illustrated in FIG. 5. Initially, the valve 116 is yieldably secured in position by the spring 126, and, accordingly, fluid flow is restricted by an orifice of fixed area. The force-velocity relationship, therefore, is parabolic in nature, as depicted by the region between zero and $V_1$ in./sec. in FIG. 5. As the force increases, however, the pressure on the valve 116 increases, and eventually the influence of the spring 126 is overcome. Thereupon, the valve 116 moves downwardly and in so doing withdraws the pin 122 slightly from the orifice 128 in the plate 104. Thus the compression valve is converted from a fixed to a variable area orifice valve, and after a brief transition region between $V_1$ and $V_2$ in./sec., the valving system yields a linear force-velocity relationship up to $V_3$ in./sec. Hence, significant force levels are produced at low velocity, affording a highly efficient damping system, and the force output is limited so as to preclude excessive force resulting from wheel-rail impact.

When the truck bolster moves upwardly, the compression coil spring 112 acts to urge the piston rod and piston head upwardly. As the piston head approaches its initial extended position, the compensating chamber decreases in volume, while at the same time the compression chamber increases in volume. Hydraulic fluid is forced from the compensating chamber into the compression chamber via the several large unvalved passages 146 in the piston head, but the compression chamber is capable of taking more hydraulic fluid than is displaced from the compensating chamber. As a consequence, a vacuum is developed in the compression chamber, and the check valve 140 is raised from its seat against the influence of the compression coil spring 142. Thereupon, fluid is drawn from the reservoir 152 sufficient to fill the void in the compression chamber, the flow path being via the several passages 136 and the several large openings 138 in the annulus 28.

With a hydraulic system of the nature described, there is obtained a force output which is solely a function of velocity input. Unlike a spring, which absorbs energy upon compression and returns it back into the system as it extends, the motion damping device of the present invention absorbs energy from the system upon compression and dissipates it in the form of heat. None of the energy is returned to the system.

Figure 3:
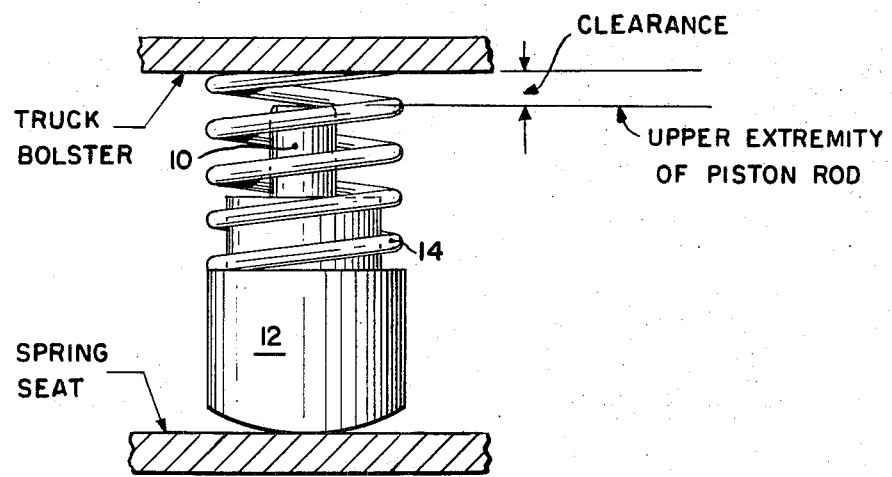
FIG. 3 diagrammatically illustrates an empty car condition.
Figure 4:
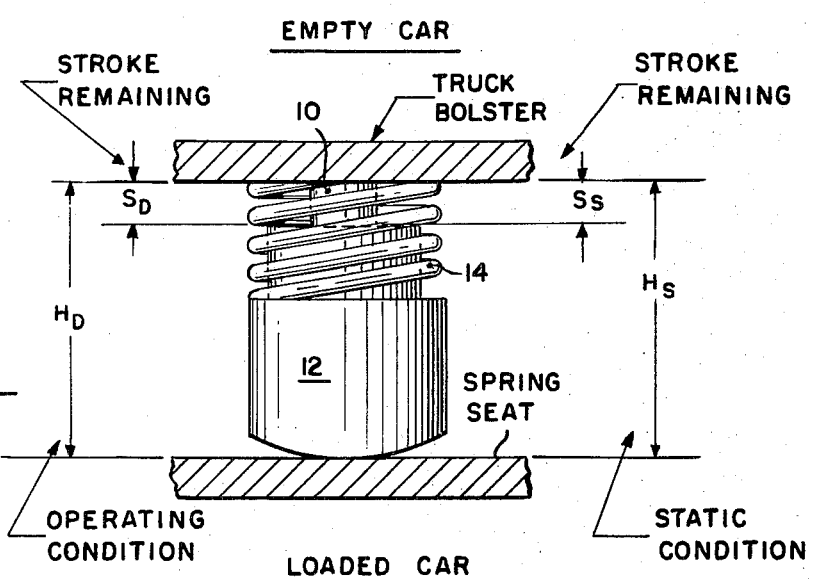
FIG. 4 diagrammatically illustrates two different loaded car conditions.

The motion damping device has an overall height greater than that of the spring group 154 when the retention spring 14 is fully extended. When the device is applied between the spring seat of the truck side frame and the truck bolster, the geometry is as shown in FIGS. 3 and 4. FIG. 3 shows an empty car condition, and FIG. 4 shows operating and static loaded car conditions. Internally the dimensions are such that internal bottoming is avoided. Externally the dimensions are such that the truck springs will go solid first and function as a mechanical stop preventing the device from going solid.

The geometry of the preferred embodiment of the motion damping device is an extremely beneficial feature for freight car operation. In designing a freight car, it is conventional to determine the capacity of the truck spring group, and thus the spring rate, on the basis of the loaded car configuration. Usually, this yields a spring group which is entirely too stiff for ideal ride conditions of the empty car. By introducing the motion damping device of the present invention in the spring group, however, there is obtained a more ideal marriage between mass and spring rate for the empty car, as a consequence of the removal of springs to make room for insertion of the motion damping device in the spring group, as well as the appropriate relationship between mass, springing and damping for the loaded car, as a consequence of the insertion of the motion damping device in the spring group.

Furthermore, referring particularly to FIG. 3, in the empty car condition the geometry of the preferred embodiment of the motion damping device has the beneficial feature that the upper extremity of the piston rod 92 is significantly below the truck bolster. As a consequence, the motion damping device is dormant when the car is empty. This configuration, therefore, yields the soft springing desired for the light car condition.

One might expect that the reduction in spring capacity or spring rate resulting from the removal of an inner and outer coil spring combination and insertion of the motion damping device of the present invention, would have a detrimental effect when the car is loaded, but this is not the case. When the freight car is loaded and standing still, there is no relative motion between the truck bolster and side frame, and therefore no velocity input to the motion damping device. Hence, the device is dormant, and the spring height is reduced from the normal height H for a loaded car to $H_S$, as shown in FIG. 4, right hand side. However, when the car is in operation, there is relative motion between the truck bolster and side frame, and in response thereto the motion damping device develops a corresponding force which is greater than that which would have been developed by the inner and outer coil spring combination which it replaced. This additional force tends to place the normal operating loaded car spring height at $H_D$, as shown in FIG. 4, left hand side, resulting in a greater spring height over the normal spring height H of a conventional spring group.

Figure 6:
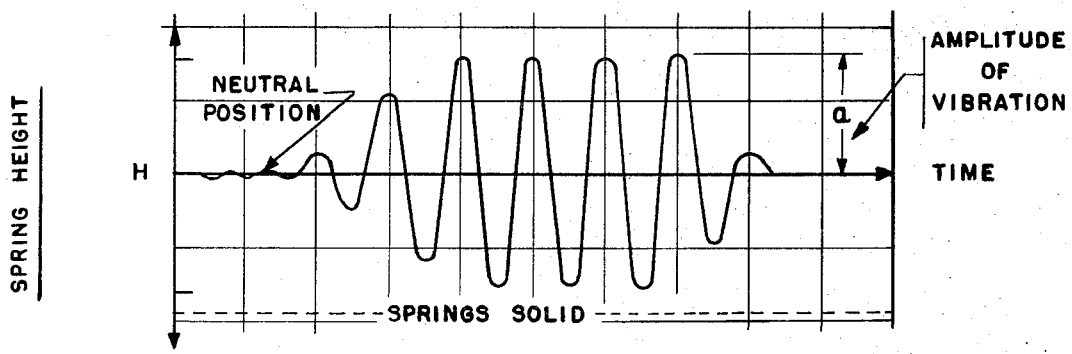
FIG. 6 is a diagram wherein truck spring height is plotted against time to illustrate the spring motion of a railroad car when the spring group is not damped.
Figure 7:
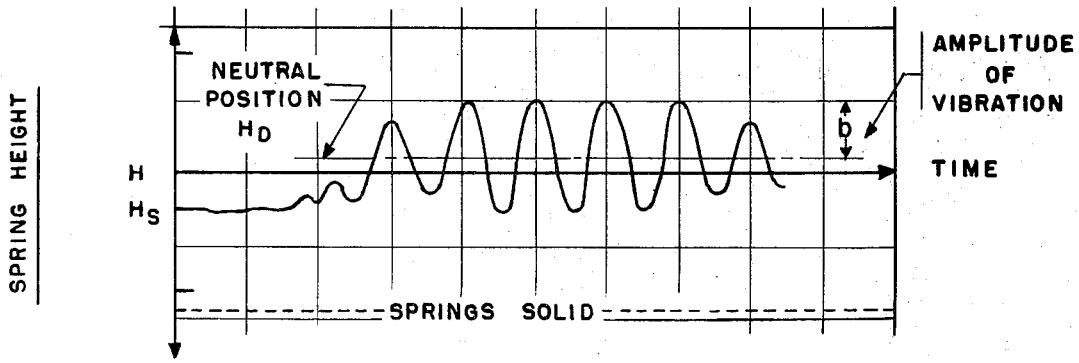
FIG. 7 is a diagram wherein truck spring height is plotted against time to illustrate the spring motion of a railroad car when the spring group is damped.
Figure 8:
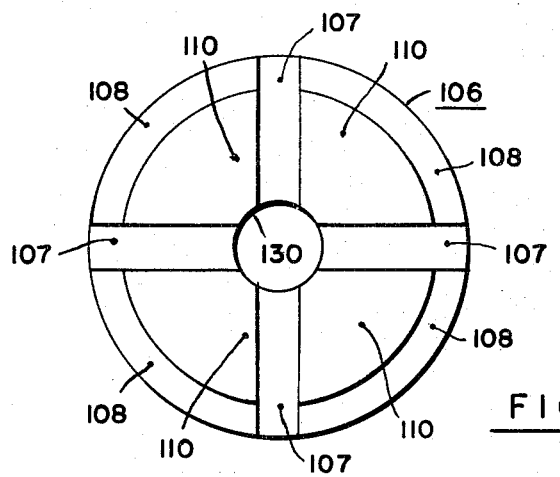
FIG. 8 is an enlarged section on lines VIII—VIII in FIG. 1, parts being omitted to expose certain details.
Figure 9:
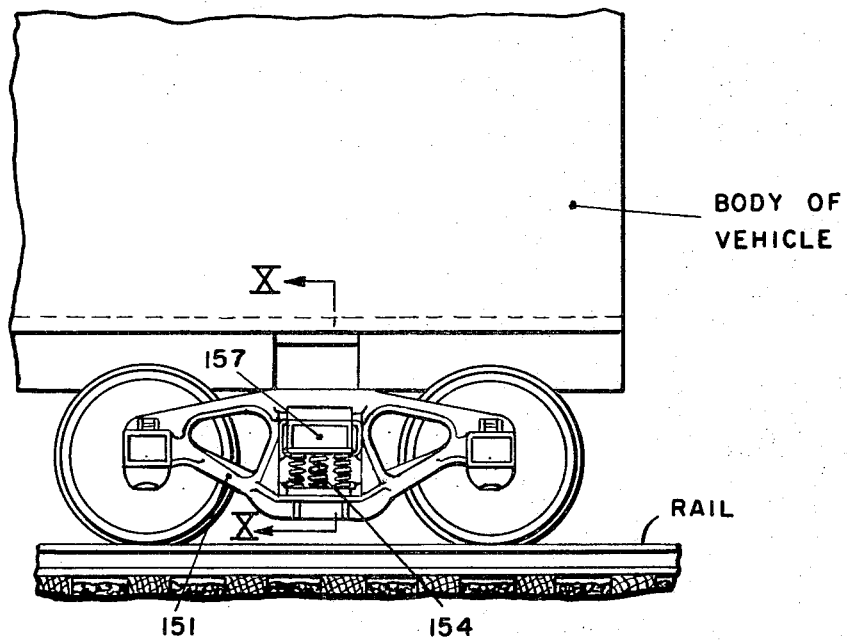
FIG. 9 is a fragmentary side elevation of a railroad car constructed in accordance with the invention.
Figure 10:
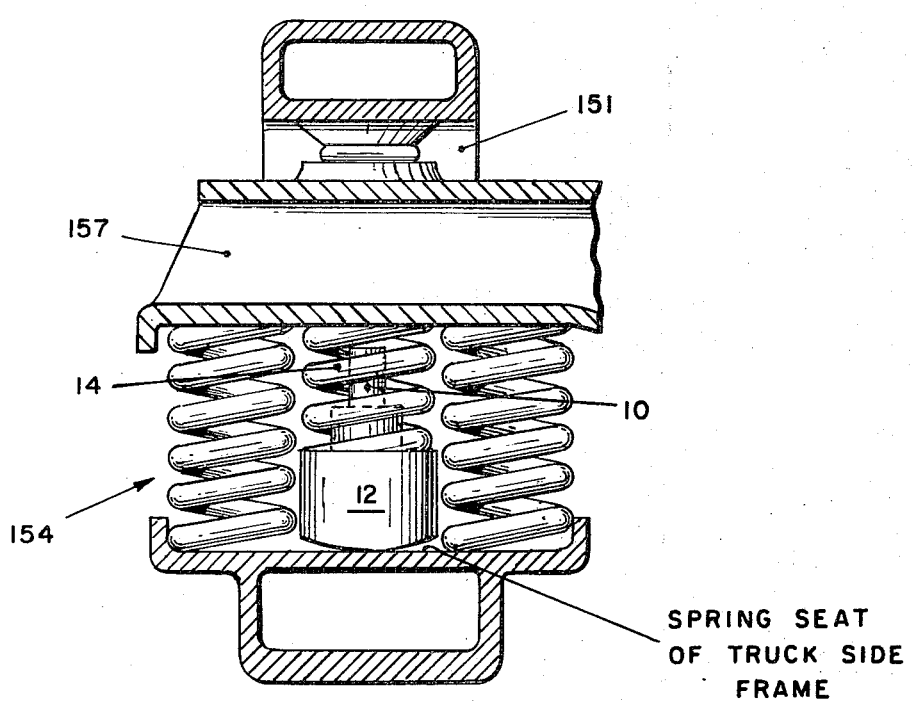
FIG. 10 is an enlarged fragmentary section on line X—X in FIG. 9.

The phenomenon described above may be readily understood by examining and comparing FIGS. 6 and 7. Referring particularly to FIG. 6, consider a loaded car incorporating a conventional spring group. Prior to entering upon a stretch of bad track, the spring height is the normal height H, but, when the car is subjected to the bad track input, the springs oscillate about the mean position of H with an amplitude "$a$." Now referring particularly to FIG. 7, when the same car is equipped with the motion damping device of the present invention, the normal spring height is $H_S$ prior to entering upon the stretch of bad track. However, as the car starts to experience the undesirable track condition, the motion damping device is subjected to an input velocity, and it responds by generating a corresponding force which has the tendency to raise the mean position from $H_S$ to $H_D$. Furthermore, the amplitude of vibration, designated "$b$," for this spring group, since it is now a damped system, tends to be significantly smaller than that experienced on the car when incorporating the conventional spring group. This reduction in the amplitude is a consequence of the more stable car. This plus the elevated mean position for spring oscillation, considerably reduces any possible chance of the surrounding truck springs from going solid.

Referring particularly to FIG. 1, floating upon the hydraulic fluid, designated 156, in the reservoir 152 is a piston which is in the form of a ring or annulus 158 provided with a flange 160 depending from the outer marginal area thereof and a flange 162 extending upwardly from the inner marginal area thereof. The outer and inner peripheries of the piston are respectively provided with 0-rings 164 and 166. As the surface of the hydraulic fluid rises and falls in the reservoir 152 in response to actuation of the piston head 94, the floating piston 158 moves up and down therewith, the 0-ring 164 sliding along the inner surface of the cylindrical wall 18 of the casing 16 and the 0-ring 166 sliding along the outer surface of the cylindrical member 52.

In the absence of the floating piston 158, the motion damping device described hereinabove can be used to best advantage only in situations where the device will always remain more or less disposed with the right end thereof uppermost, i.e., as shown in FIG. 1. In this position, the hydraulic fluid in the reservoir is disposed at the bottom thereof, interposed between the air in the reservoir and the valved passages controlling the hydraulic fluid flow path between the reservoir and the compression chamber. As a consequence, when the piston head 94 is extended, hydraulic fluid is readily drawn from the reservoir 152 through said valved passages into the compression chamber 148. However, when the device is tilted from the vertical a substantial angular distance or disposed with the wrong end thereof uppermost, as when it is installed right end up on a railroad car which is then temporarily turned bodily upside down to unload the same, the hydraulic fluid and the air in the reservoir exchange places. As a consequence, the air is interposed between the hydraulic fluid and said valved passages, and when the piston head 94 is extended, air, which is highly compressible, instead of hydraulic fluid, which is not compressible, is drawn into the compression chamber 148. Accordingly, when the piston head 94 then contracts, it must compress the air in the compression chamber 148 sufficiently to bring its pressure up to a predetermined level before the device can begin to function for the purpose intended. Thus a sharp loss in efficiency occurs. Use of the floating piston 158 eliminates the problem by functioning to keep the hydraulic fluid in the reservoir separated from the air in the reservoir, and to keep said hydraulic and air from exchanging places when the device is tilted to one side or disposed with the wrong end thereof uppermost. Thus, the availability of hydraulic fluid for being drawn from the reservoir into the compression chamber when the piston head 94 is extended is assured.

While in accordance with the provisions of the patent statutes, I have illustrated and described the best form or embodiment of my invention now known to me, it will be apparent to those skilled in the art that changes may be made in the form of the structure described without departing from the spirit and scope of the invention as set forth in the appended claims. For example, the unvalved passages 146 in the piston head 94 provide for the restricted but continuous free flow of hydraulic fluid between the compression and compensating chambers in response to all movement of the piston head 94 in either direction. Such a flow of hydraulic fluid may be effected by other means too. For example, the wall of the cylindrical member 52 may be suitably grooved, or the O-ring 96 may be omitted and the O.D. of the piston head 94 may be made suitably smaller than the I.D. of the cylindrical member 52.

What is claimed is:

1. In a motion damping device, the combination comprising
    A. a casing,
    B. a tubular member within said casing, said member defining a working chamber and said member and casing conjointly defining a reservoir,
    C. a piston rod slidably extending through the top of said casing into said working chamber,
    D. a piston head on said piston rod for operating in said working chamber and thereby dividing the same into a variable volume compression chamber under said piston head and a variable volume compensating chamber above said piston head,
    E. a compression coil spring within said compression chamber yieldably urging said piston rod and piston head upwardly to extend the same,
    F. hydraulic fluid passage means provided with a fixed area orifice in a flow path between said compression chamber and reservoir,
    G. unvalved hydraulic fluid passage means providing for a restricted but continuous free flow of hydraulic fluid between said compression and compensating chambers in response to all movement of said piston head in either direction,
    H. means for converting said fixed area orifice to a variable area orifice and progressively increasing said area and the consequent flow of hydraulic fluid from said compression chamber to said reservoir in response to retraction of said piston head and the consequent increase in hydraulic fluid pressure in said compression chamber as it decreases in volume,
    I. valved hydraulic fluid passage means, the valve being operable for checking the flow of hydraulic fluid from said compression chamber to said reservoir through the associated passage means when the compression chamber is decreasing in volume, and being operable for opening and thereby permitting a free flow of hydraulic fluid from said reservoir to said compression chamber through the associated passage means when the compression chamber is increasing in volume, and
    J. a compression coil spring seated upon said casing and extending upwardly therefrom a substantial distance above the upper extremity of said piston rod.

2. The combination according to claim 1 wherein the unvalved hydraulic fluid passage means providing for a restricted but continuous free flow of hydraulic fluid between the compression and compensating chambers in response to all movement of the piston head in either direction comprises a series of openings extending through said piston head and circumferentially spaced thereabout.

3. The combination according to claim 1 wherein the tubular member providing a working chamber is seated upon the outer marginal area of an annulus which in turn is seated directly upon the bottom of the casing, the casing is provided with a boss extending upwardly from the bottom thereof through said annulus into the compression chamber, and the lower end portion of the compression coil spring within said compression chamber is operatively seated upon the top of said boss.

4. The combination according to claim 3 wherein the upper end portion of the compression coil spring within the compression chamber extends through the piston head and into the lower end portion of the piston rod.

5. The combination according to claim 1 wherein the tubular member providing a working chamber is seated upon the outer marginal area of an annulus which in turn is seated directly upon the bottom of the casing, the casing is provided with a boss extending upwardly from the bottom thereof through said annulus into the compression chamber, and said boss is bored and the undersurface of said annulus is grooved thereby to provide a passage for the flow of hydraulic fluid between the compression chamber and the reservoir.

6. The combination according to claim 5 wherein a series of openings circumferentially spaced about the annulus extend therethrough, said openings and the grooves in the undersurface of said annulus conjointly provide a passage for the flow of hydraulic fluid between the compression chamber and reservoir, and spring pressed valve means in said compression chamber provide for unidirectional flow of hydraulic fluid through said series of openings from said reservoir into said compression chamber.

7. In a motion damping device, the combination comprising
   A. an upright cylindrical casing closed at the bottom and open at the top,
   B. an annulus seated on the bottom of the casing,
   C. a boss extending upwardly from the bottom of said casing and through said annulus,
   D. an upright cylindrical member within said casing seated upon the outer marginal area of said annulus,
   E. closure means for the top of said casing including a piston rod slidably projected through said closure means and extending into the interior of said cylindrical member,
   F. a piston head in said cylindrical member carried by said piston rod, there being thus formed a variable volume compression chamber under said piston head, a variable volume compensating chamber over said piston head and a constant volume reservoir between said cylindrical member and casing,
   G. unvalved hydraulic fluid passages extending through said piston head and providing for a restricted but continuous free flow of hydraulic fluid between said compression and compensating chambers in response to movement of said piston head in either direction,
   H. a compression coil spring operatively seated upon said boss and extending upwardly therefrom through said piston head for being telescoped into the lower end portion of said piston rod, said spring being operative for urging said piston rod and piston head upwardly, thereby to extend the same,
   I. hydraulic fluid passage means establishing communication between said compression chamber and reservoir via a plurality of flow paths,
   J. means in one of said flow paths providing a fixed area orifice including spring pressed valve means responsive to hydraulic fluid pressure for converting said fixed area orifice into a variable area orifice,
   K. spring pressed valve means in said compression chamber operable for providing a unidirectional hydraulic fluid flow along the other of said flow paths, from said reservoir into said compression chamber, and
   L. a compression coil spring seated upon said casing and extending upwardly therefrom a substantial distance above the upper extremity of said piston rod.

8. In a railroad vehicle, the combination comprising
   A. a vehicle body,
   B. a pair of trucks respectively at opposite ends of said body, each including
      1. a pair of wheeled frames,
      2. a bolster, and
      3. compression coil spring groups each carried by one of said frames and supporting the associated end of said bolster, and
   C. unitary motion damping means each associated with one of said spring groups including
      1. a casing seated upon the associated one of said frames,
      2. a tubular member within said casing, said member defining a working chamber and said member and casing conjointly defining a reservoir,
      3. a piston rod slidably extending through the top of said casing into said working chamber,
      4. a piston head on said piston rod for operating in said working chamber and thereby dividing the same into a variable volume compression chamber under said piston head and a variable volume compensating chamber above said piston head,
      5. a compression coil spring within said compression chamber yieldably urging said piston rod and piston head upwardly to extend the same,
      6. hydraulic fluid passage means provided with a fixed area orifice in a flow path between said compression chamber and reservoir,
      7. unvalved hydraulic fluid passage means providing for a restricted but continuous free flow of hydraulic fluid between said compression and compensating chambers in response to all movement of said piston head in either direction,
      8. means for converting said fixed area orifice to a variable area orifice and progressively increasing said area and the consequent flow of hydraulic fluid from said compression chamber to said reservoir in response to retraction of said piston head and the consequent increase in hydraulic fluid pressure in said compression chamber as it decreases in volume,
      9. valved hydraulic fluid passage means, the valve being operable for checking the flow of hydraulic fluid from said compression chamber to said reservoir through the associated passage means when the compression chamber is decreasing in volume, and being operable for opening and thereby permitting a free flow of hydraulic fluid from said reservoir to said compression chamber through the associated passage means when the compression chamber is increasing in volume, and
      10. a compression coil spring seated upon said casing and extending upwardly therefrom a substantial distance above the upper extremity of said piston rod for engaging said bolster, said spring being partially compressed and effective for securing said motion damping means in position between said frame and bolster.

9. The combination according to claim 8 wherein the unvalved hydraulic fluid passage means providing for a restricted but continuous free flow of hydraulic fluid between the compression and compensating chambers in response to all movement of the piston head in either direction comprises a series of openings extending through said piston head and circumferentially spaced thereabout.

10. The combination according to claim 8 wherein the tubular member providing a working chamber is seated upon the outer marginal area of an annulus which in turn is seated directly upon the bottom of the casing, the casing is provided with a boss extending upwardly from the bottom thereof through said annulus into the compression chamber, and the lower end portion of the compression coil spring within said compression chamber is operatively seated upon the top of said boss.

11. The combination according to claim 10 wherein the upper end portion of the compression coil spring within the compression chamber extends through the piston head and into the lower end portion of the piston rod.

12. The combination according to claim 8 wherein the tubular member providing a working chamber is seated upon the outer marginal area of an annulus which in turn is seated directly upon the bottom of the casing, the casing is provided with a boss extending upwardly from the bottom thereof through said annulus into the compression chamber, and said boss is bored and the undersurface of said annulus is grooved thereby to provide a passage for the flow of hydraulic fluid between the compression chamber and the reservoir.

13. The combination according to claim 12 wherein a series of openings circumferentially spaced about the annulus extend therethrough, said openings and the grooves in the undersurface of said annulus conjointly provide a passage for the flow of hydraulic fluid between the compression chamber and reservoir, and spring pressed valve means in said compression chamber provide for unidirectional flow of hydraulic fluid through said series of openings from said reservoir into said compression chamber.

14. In a railroad car, the combination comprising
A. a car body,
B. a pair of trucks respectively at opposite ends of said body, each including
 1. a pair of wheeled frames,
 2. a bolster, and
 3. a pair of compression coil spring groups each seated upon one of said frames and supporting the associated end of said bolster, and
C. unitary motion damping means each associated with one of said spring groups including
 1. an upright cylindrical casing seated upon said frame, said casing being closed at the bottom and open at the top,
 2. an annulus seated on the bottom of the casing,
 3. a boss extending upwardly from the bottom of said casing and through said annulus,
 4. an upright cylindrical member within said casing seated upon the outer marginal area of said annulus,
 5. closure means for the top of said casing including a piston rod slidably projected through said closure means and extending into the interior of said cylindrical member,
 6. a piston head in said cylindrical member carried by said piston rod, there being thus formed a variable volume compression chamber under said piston head, a variable volume compensating chamber over said piston head and a constant volume reservoir between said cylindrical member and casing,
 7. unvalved hydraulic fluid passages extending through said piston head and providing for a restricted but continuous free flow of hydraulic fluid between said compression and compensating chambers in response to movement of said piston head in either direction,
 8. a compression coil spring operatively seated upon said boss and extending upwardly therefrom through said piston head for being telescoped into the lower end portion of said piston rod, said spring being operative for urging said piston rod and piston head upwardly, thereby to extend the same,
 9. hydraulic fluid passage means establishing communication between said compression chamber and reservoir via a plurality of flow paths,
 10. means in one of said flow paths providing a fixed area orifice including spring pressed valve means responsive to hydraulic fluid pressure for converting said fixed area orifice into a variable area orifice,
 11. spring pressed valve means in said compression chamber operable for providing a unidirectional hydraulic fluid flow along the other of said flow paths, from said reservoir into said compression chamber, and
 12. a compression coil spring seated upon said casing and extending upwardly therefrom a substantial distance above the upper extremity of said piston rod for engaging said bolster, said spring being partially compressed and effective for securing said motion damping means in position between said frame and bolster.

15. In a motion damping device, the combination comprising
A. a casing,
B. a member within said casing defining a working chamber and conjointly with said casing defining a reservoir extending about said member,
C. a piston head operating in said working chamber and dividing the same into variable volume compression and compensating chambers,
D. a piston rod extending upwardly from said piston head and through the top of said casing,
E. spring means yieldably biasing said piston head upwardly to extend said piston rod,
F. hydraulic fluid completely filling said compression and compensating chambers and partially filling said reservoir,
G. means valved for passage of said fluid from said compression chamber to said reservoir when said piston head is retracted against the influence of said spring means and for passage of said fluid from said reservoir to said compression chamber when said piston head is extended by said spring means,
H. means in said reservoir floating on the hydraulic fluid therein and arranged for separating the same from the medium occupying the space thereabove, and for keeping said hydraulic fluid and medium from exchanging places in said reservoir when said device is turned upside down, and
I. a compression coil spring seated upon said casing and extending upwardly therefrom a substantial distance above the upper extremity of said piston rod.

16. The combination according to claim 15 wherein the floating means in the reservoir comprises an annular piston, and the casing, the member defining a working chamber and said annular piston are concentrically disposed, said annular piston being disposed with said casing and the member defining said working chamber being disposed within said annular piston.

17. The combination according to claim 16 wherein the annular piston is slidably accommodated between cylindrical sections respectively of the casing and the member defining a working chamber.

18. The combination according to claim 17 wherein both the outer and inner peripheries of the annular piston mount 0-rings, the 0-ring provided on the outer periphery being disposed in sliding contact with the opposed surface of the casing, and the 0-ring provided on the inner periphery being disposed in sliding contact with the opposed surface of the member defining a working chamber.

19. In a motion damping device, the combination comprising
   A. a casing provided with an upright cylindrical section,
   B. a cylindrical member within the upright cylindrical section of said casing, said member defining a working chamber and said member and casing conjointly defining a reservoir,
   C. a piston head for operating in said working chamber and thereby dividing the same into a variable volume compression chamber under said piston head and a variable volume compensating chamber above said piston head,
   D. a piston rod extending upwardly from said piston head and slidably through the top of said casing,
   E. a compression coil spring within said compression chamber yieldably urging said piston head and piston rod upwardly to extend the same,
   F. hydraulic fluid completely filling said compression and compensating chambers and partially filling said reservoir,
   G. hydraulic fluid passage means provided with a fixed area orifice in a flow path between said compression chamber and reservoir,
   H. unvalved hydraulic fluid passage means providing for a restricted but continuous free flow of hydraulic fluid between said compression and compensating chambers in response to all movement of said piston head in either direction,
   I. means for converting said fixed area orifice to a variable area orifice and progressively increasing said area and the consequent flow of hydraulic fluid from said compression chamber to said reservoir in response to retraction of said piston head and the consequent increase in hydraulic fluid pressure in said compression chamber as it decreases in volume,
   J. valved hydraulic fluid passage means, the valve being operable for checking the flow of hydraulic fluid from said compression chamber to said reservoir through the associated passage means when the compression chamber is decreasing in volume, and being operable for opening and thereby permitting a free flow of hydraulic fluid from said reservoir to said compression chamber through the associated passage means when the compression chamber is increasing in volume,
   K. an annular piston concentrically disposed between the upright cylindrical section of said casing and the member defining a working chamber and floating on the hydraulic fluid in said reservoir, said annular piston being provided with 0-rings extending about the inner and outer peripheries thereof, the 0-ring provided on the outer periphery being disposed in sliding contact with the opposed surface of the casing, and the 0-ring provided on the inner periphery being disposed in sliding contact with the opposed surface of the member defining said working chamber, said annular piston provided with 0-rings as aforesaid being thereby arranged for separating the hydraulic fluid in said reservoir from the medium occupying the space thereabove, and for keeping said hydraulic fluid and medium from exchanging places in said reservoir when said device is turned upside down, and
   L. a compression coil spring seated upon said casing and extending upwardly therefrom a substantial distance above the upper extremity of said piston rod.

20. In a railroad vehicle, the combination comprising
   A. a vehicle body,
   B. a pair of trucks respectively at opposite ends of said body, each including
      1. a pair of wheeled frames,
      2. a bolster, and
      3. compression coil spring groups each carried by one of said frames and supporting the associated end of said bolster, and
   C. unitary motion damping means each associated with one of said spring groups including
      1. a casing seated upon the associated one of said frames,
      2. a member within said casing defining a working chamber and conjointly with said casing defining a reservoir extending about said member,
      3. a piston head operating in said working chamber and dividing the same into variable volume compression and compensating chambers,
      4. a piston rod extending upwardly from said piston head and through the top of said casing,
      5. spring means yieldably biasing said piston head upwardly to extend said piston rod,
      6. hydraulic fluid completely filling said compression and compensating chambers and partially filling said reservoir,
      7. means valved for passage of said fluid from said compression chamber to said reservoir when said piston head is retracted against the influence of said spring means and for passage of said fluid from said reservoir to said compression chamber when said piston head is extended by said spring means,
      8. means in said reservoir floating on the hydraulic fluid therein and arranged for separating the same from the medium occupying the space thereabove, and for keeping said hydraulic fluid and medium from exchanging places in said reservoir when said vehicle is turned upside down, and
      9. a compression coil spring seated upon said casing and extending upwardly therefrom a substantial distance above the upper extremity of said piston rod for engaging said bolster, said spring being partially compressed and effective for securing said motion damping means in position between said frame and bolster.

21. The combination according to claim 20 wherein the floating means in the reservoir comprises an annular piston, and the casing, the member defining a working chamber and said annular piston are concentrically disposed, said annular piston being disposed within said casing and the member defining said working chamber being disposed within said annular piston.

22. The combination according to claim 21 wherein the annular piston is slidably accommodated between cylindrical sections respectively of the casing and the member defining a working chamber.

23. The combination according to claim 22 wherein both the outer and inner peripheries of the annular piston mount 0-rings, the 0-ring provided on the outer periphery being disposed in sliding contact with the opposed surface of the casing, and the 0-ring provided on the inner periphery being disposed in sliding contact with the opposed surface of the member defining a working chamber.

24. In a railroad vehicle, the combination comprising

A. a vehicle body,
B. a pair of trucks respectively at opposite ends of said body, each including
   1. a pair of wheeled frames,
   2. a bolster, and
   3. compression coil spring groups each carried by one of said frames and supporting the associated end of said bolster, and
C. unitary motion damping means each associated with one of said spring groups including
   1. a casing provided with an upright cylindrical section,
   2. a cylindrical member within the upright cylindrical section of said casing, said member defining a working chamber and said member and casing conjointly defining a reservoir,
   3. a piston head for operating in said working chamber and thereby dividing the same into a variable volume compression chamber under said piston head and a variable volume compensating chamber above said piston head,
   4. a piston rod extending upwardly from said piston head and slidably through the top of said casing,
   5. a compression coil spring within said compression chamber yieldably urging said piston head and piston rod upwardly to extend the same,
   6. hydraulic fluid completely filling said compression and compensating chambers and partially filling said reservoir,
   7. hydraulic fluid passage means provided with a fixed area orifice in a flow path between said compression chamber and reservoir,
   8. unvalved hydraulic fluid passage means providing for a restricted but continuous free flow of hydraulic fluid between said compression and compensating chambers in response to all movement of said piston head in either direction,
   9. means for converting said fixed area orifice to a variable area orifice and progressively increasing said area and the consequent flow of hydraulic fluid from said compression chamber to said reservoir in response to retraction of said piston head and the consequent increase in hydraulic fluid pressure in said compression chamber as it decreases in volume,
   10. valved hydraulic fluid passage means, the valve being operable for checking the flow of hydraulic fluid from said compression chamber to said reservoir through the associated passage means when the compression chamber is decreasing in volume, and being operable for opening and thereby permitting a free flow of hydraulic fluid from said reservoir to said compression chamber through the associated passage means when the compression chamber is increasing in volume,
   11. an annular piston concentrically disposed between the upright cylindrical section of said casing and the member defining a working chamber and floating on the hydraulic fluid in said reservoir, said annular piston being provided with 0-rings extending about the inner and outer peripheries thereof, the 0-ring provided on the outer periphery being disposed in sliding contact with the opposed surface of the casing, and the 0-ring provided on the inner periphery being disposed in sliding contact with the opposed surface of the member defining said working chamber, said annular piston provided with 0-rings as aforesaid being thereby arranged for separating the hydraulic fluid in said reservoir from the medium occupying the space thereabove, and for keeping said hydraulic fluid and medium from exchanging places in said reservoir when said device is turned upside down, and
   12. a compression coil spring seated upon said casing and extending upwardly therefrom a substantial distance above the upper extremity of said piston rod for engaging said bolster, said spring being partially compressed and effective for securing said motion damping means in position between said frame and bolster.

* * * * *

UNITED STATES PATENT OFFICE
CERTIFICATE OF CORRECTION

Patent No. 3,831,529          Dated AUGUST 27, 1974

Inventor(s) STUART A. SCHWAM

It is certified that error appears in the above-identified patent and that said Letters Patent are hereby corrected as shown below:

COLUMN 1, line 64, "aid" should read --said--.

COLUMN 9, line 31, after "draulic" and before "and" insert --fluid--.

Signed and sealed this 5th day of November 1974.

(SEAL)
Attest:

McCOY M. GIBSON JR.
Attesting Officer

C. MARSHALL DANN
Commissioner of Patents